(12) United States Patent
Prabhat et al.

(10) Patent No.: US 8,610,920 B2
(45) Date of Patent: Dec. 17, 2013

(54) VISUALIZER AND JOB CONTROL DIRECTOR FOR PRINTING SYSTEMS

(75) Inventors: Saurabh Prabhat, Webster, NY (US); Norman W. Zeck, Ontario, NY (US); Robert M. Lofthus, Webster, NY (US)

(73) Assignee: Xerox Corporation, Norwalk, CT (US)

(*) Notice: Subject to any disclaimer, the term of this patent is extended or adjusted under 35 U.S.C. 154(b) by 642 days.

(21) Appl. No.: 12/423,999

(22) Filed: Apr. 15, 2009

(65) Prior Publication Data
US 2010/0265534 A1    Oct. 21, 2010

(51) Int. Cl.
  G06F 3/00  (2006.01)
  G06F 3/12  (2006.01)
  G06F 15/173  (2006.01)

(52) U.S. Cl.
  USPC ........... 358/1.15; 709/225; 709/226; 715/744

(58) Field of Classification Search
  USPC ........... 358/1.15; 705/26, 1, 80; 709/203, 107
  See application file for complete search history.

(56) References Cited

U.S. PATENT DOCUMENTS

| | | | |
|---|---|---|---|
| 6,744,527 B1 * | 6/2004 | Dorsey et al. | 358/1.12 |
| 6,798,530 B1 * | 9/2004 | Buckley et al. | 358/1.13 |
| 6,959,165 B2 | 10/2005 | Mandel et al. | |
| 6,973,286 B2 | 12/2005 | Mandel et al. | |
| 7,224,913 B2 | 5/2007 | Richards | |
| 7,245,838 B2 | 7/2007 | Swift | |
| 7,302,199 B2 | 11/2007 | German et al. | |
| 7,308,218 B2 | 12/2007 | Roof et al. | |
| 7,493,055 B2 | 2/2009 | German et al. | |
| 7,587,336 B1 * | 9/2009 | Wallgren et al. | 705/26.1 |
| 2002/0057455 A1 * | 5/2002 | Gotoh et al. | 358/1.15 |
| 2006/0039026 A1 | 2/2006 | Lofthus et al. | |
| 2006/0132815 A1 | 6/2006 | Lofthus et al. | |
| 2006/0227350 A1 | 10/2006 | Crawford et al. | |
| 2006/0230201 A1 | 10/2006 | Fromherz et al. | |
| 2006/0230403 A1 | 10/2006 | Crawford et al. | |
| 2006/0235547 A1 | 10/2006 | Hindi | |
| 2006/0268317 A1 | 11/2006 | Lofthus et al. | |
| 2006/0268318 A1 | 11/2006 | Lofthus et al. | |
| 2006/0285159 A1 | 12/2006 | Frankel | |
| 2007/0002085 A1 | 1/2007 | Sampath et al. | |
| 2007/0195355 A1 | 8/2007 | Banton | |
| 2007/0204226 A1 | 8/2007 | Hindi et al. | |
| 2007/0216746 A1 | 9/2007 | Rizzolo et al. | |
| 2008/0225326 A1 * | 9/2008 | Kephart et al. | 358/1.15 |

* cited by examiner

*Primary Examiner* — Marivelisse Santiago Cordero
*Assistant Examiner* — Moustapha Diaby
(74) *Attorney, Agent, or Firm* — Fay Sharpe LLP (57) ABSTRACT

A system is utilized to view and configure one or more print job scenarios within a print system. A preference module allows a user to select one or more preferences related to a print job in view of a job set and one or more limitations related to hardware within the print system. A rules component creates one or more rules for use within the print system to output a hard copy based at least in part upon the preferences selected via the preference module. A scheduler receives one or more rules from the rules component and configures the print system to execute the print job according to the preferences and/or the rules. A visualizer displays a scenario associated with each print system configuration, wherein the preferences and the rules can be edited to create one or more scenarios for execution of the print job.

20 Claims, 6 Drawing Sheets

000# VISUALIZER AND JOB CONTROL DIRECTOR FOR PRINTING SYSTEMS

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. Publication No. US-2006-0039026, Published Feb. 23, 2006, entitled "PRINT SEQUENCE SCHEDULING FOR RELIABILITY," by Robert M. Lofthus, et al., U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Publication No. US-2006-0132815-A1, Published Jun. 22, 2006, entitled "PRINTING SYSTEMS," by Robert M. Lofthus, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P.J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Pat. No. 7,224,913, issued May 29, 2007, entitled "PRINTING SYSTEM AND SCHEDULING METHOD," by Austin L. Richards;

U.S. Pat. No. 7,302,199, issued Nov. 27, 2007, entitled "PRINTING SYSTEMS," by Kristine A. German, et al.;

U.S. Publication No. US-2006-0268318, Published Nov. 30, 2006, entitled "PRINTING SYSTEM," by Robert M. Lofthus, et al.;

U.S. Publication No. US-2006-0268317, Published Nov. 30, 2006, entitled "SCHEDULING SYSTEM," by Robert M. Lofthus, et al.;

U.S. Pat. No. 7,308,218, issued Dec. 11, 200, entitled "WARM-UP OF MULTIPLE INTEGRATED MARKING ENGINES," by Bryan J. Roof, et al.;

U.S. Pat. No. 7,245,838, issued Jul. 17, 2007, entitled "PRINTING PLATFORM," by Joseph A. Swift;

U.S. Publication No. US-2006-0285159, published Dec. 21, 2006, entitled "METHOD OF ORDERING JOB QUEUE OF MARKING SYSTEMS," by Neil A. Frankel;

U.S. Publication No. US-2007-0002085, published Jan. 4, 2007, entitled "HIGH AVAILABILITY PRINTING SYSTEMS," by Meera Sampath, et al.;

U.S. Publication No. US-2007-0195355, published Aug. 23, 2007, entitled "MULTI-MARKING ENGINE PRINTING PLATFORM", by Martin E. Banton;

U.S. Publication No. US-2007-0204226, published Aug. 30, 2007, entitled "SYSTEM AND METHOD FOR MANUFACTURING SYSTEM DESIGN AND SHOP SCHEDULING USING NETWORK FLOW MODELING", by Hindi, et al.;

U.S. Publication No. US-2007-0216746, published Sep. 20, 2007, entitled "PAGE SCHEDULING FOR PRINTING ARCHITECTURES", by Charles D. Rizzolo, et al.;

U.S. Pat. No. 7,493,055, issued Feb. 17, 2009, entitled "FAULT ISOLATION OF VISIBLE DEFECTS WITH MANUAL MODULE SHUTDOWN OPTIONS", by Kristine A. German, et al.

BACKGROUND

The present exemplary embodiments relate generally to print engine management and control. In one particular application, a visual representation of a print system is presented to allow an operator to make informed control decisions. However, it is to be appreciated that the present exemplary embodiment is also amenable to other like applications.

As printing machines and related components become more complex, a need arises for systems and methods that facilitate processing numerous commands and ever-more-copious amounts of information. On the other hand, as processor speed increases and memory capacity grows, print platforms become increasingly complex in order to fully exploit the processing power of modern computing systems. The trends of increasing processing power to meet system demands and then increasing system functionality to maximize utilization of available processing power combine to cause a marked increase in the complexity of printing systems.

Conventional planning algorithms attempt to generate a planned ordering or sequence of events for processing a print job received at a printer. When multiple printing options are involved in a print job, careful routing of a sequence of pages to be printed through a printer can become crucial. For instance, print job planning can facilitate conserving resources such as toner and paper while improving throughput of a printing platform. Consumers want easy (and preferably automatic) control over their print jobs, e.g., customers may have jobs with high image quality requirements and hence may want those sheets to be printed from a specific engine. There could also be other engine specific aspects to optimize with scheduling such as maintenance or service costs/scheduling.

This problem is especially apparent in multi-engine tightly-integrated parallel printer (TIPP) systems where image quality tuning improvements or service actions may be needed if all engines are used to print the job. In this case, manual scenario planning may be tedious and planning without being able to view the implications is not optimum. Also customers may want to know and prefer to have some control over which sheet will go to which engine when running a job in a TIPP system and how the sheets are routed for simultaneous jobs. Accordingly, a need exists for systems and/or methods that facilitate automated scenario planning to allow an operator to make informed control decisions.

BRIEF DESCRIPTION

In one aspect, a system is utilized to view and configure one or more print job scenarios within a print system. A preference module allows a user to select one or more preferences related to a print job in view of a job set and one or more limitations related to hardware within the print system. A rules component creates one or more rules for use within the print system to output a hard copy based at least in part upon the preferences selected via the preference module. A scheduler receives one or more rules from the rules component and configures the print system to execute the print job according to the preferences and/or the rules. A visualizer displays a scenario associated with each print system configuration, wherein the preferences and the rules can be edited to create one or more scenarios for execution of the print job.

In another aspect, a method is employed to view and configure one or more print job scenarios within a print system. A job set is received that defines a print job. One or more constraints are received that define the limitations of each hardware component within the print system. A visual representation of the job set and the constraints is created wherein one or more preferences are selected from the visual representation based upon the job set and the constraints. Output parameters are calculated based on rules created for each of the one or more preferences. A scenario associated with each of the output parameters for execution of the print job is displayed wherein the preferences are modified if the print job scenarios are unacceptable.

In yet another aspect, a system allows an interface to view and configure one or more print job scenarios within a print system. An interactive job queue window allows a user to configure a print job as it relates to hardware components and paper paths within the print system. A real time execution window shows execution of the print job and a hard copy output window that shows hard copy output images of the print job. A preference window displays one or more preferences to be selected for each print job in order to optimize the print system for a particular purpose. A scheduler window displays a scenario associated with each preference selected.

DETAILED DESCRIPTION

Figure 1:
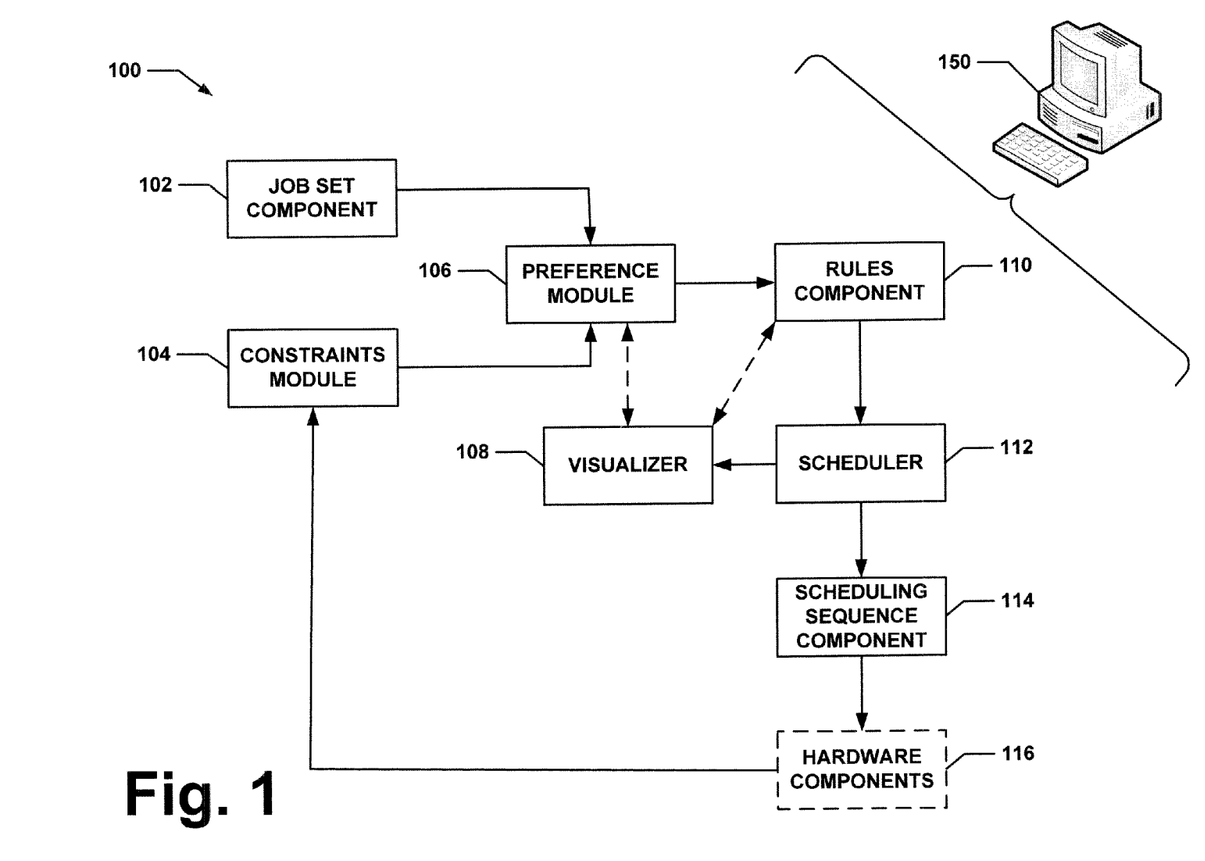
FIG. 1 illustrates a system that allows planning and control of a print system via a visualizer, in accordance with an exemplary embodiment.

FIG. 1 illustrates a print system 100 that permits control thereof via a visualizer. The visualizer can allow an operator to view multiple job queues for scenario planning. In addition, the visualizer can facilitate exercise and control over routing sheets to specific print engines within the print system and/or for singular simultaneous jobs to optimize specific requirements of each print job. The visualize can interactively give an operator alternatives for printing the job to the system 100 as it relates to various metrics such as speed, quality, cost and resource usage.

The print system 100 includes a job set 102 and a constraints module 104 that relate to each job within the print system 100. The job set 102 contains specific parameters for each print job that is output by the print system 100. Such parameters can include the number of pages for each print job, the content of each page printed including images and text, including the presentation of such output (e.g. color, black and white, etc.). Further job specific information can be provided that includes any feeding and/or finishing operations to complete each print job.

The constraints module 104 contains limitations associated with each hardware component (e.g., a feeder, a print engine, a finisher, etc.) within the print system 100. Feeders can be employed to distribute pages to respective print engines for placement of text and/or images thereon. Finishers can be utilized to bind pages together (e.g., via stapling, adhesion, etc.) or other operations prior to the end of a print operation. Each engine can have specific limitations related to machine capability. In one example, a print engine may only be capable of printing in black and white. In another example, a feeder may be limited to a particular stock of paper and/or distribution of a maximum number of sheets per minute. These machine specific limitations, stored in the constraints module 104, are taken into consideration in view of the parameters for each print job stored in the job set component 102.

A preference module 106 receives input from the job set component 102 and the constraints module 104 to allow the user to select one or more preferences related to each print job. In one example, the user may prefer to have a print job to be optimized for completion in a short time period. In this example, the user can place speed above all other print system attributes such as image quality or cost. In another example, quality of an output is of greatest concern regardless of print job length or resources used. Accordingly, the preference module can have particular optimization segments that can be selected that relate to speed, quality, cost, resource usage, for example. Each optimization segment can be prioritized to produce each print job accordingly.

A visualizer 108 provides a user interface (e.g., GUI) for a user to optimize each print job according to preferences set forth in the preference module 106. Alternatively, or in addition, the visualizer 108 can utilize a rules component 110 to discern how each print job is to be executed. The rules component 110 can work in conjunction with the preference module 106 or in place of the preference module 106. The rules component 110 can create a plurality of rules that are related to each preference selected via the preference module 106.

Rules can be applied to the components within the print system 100 to accommodate the hierarchy of optimization selected by a user. Thus, a user that selects speed as a top priority and cost as a secondary priority can facilitate the creation of rules to accommodate such a preference. Accordingly, other metrics such as quality or resource usage will be disregarded in favor of speed and cost. The rules component 110 can create rules in view of the limitations of each component within the print system 100 from the constraints module 104 as well as the requirements for each print job provided by the job set 102 and the preferences selected via the preference module 106.

In one example, a preference such as speed is associated with a rule set that includes a plurality of preconfigured rules specific to the print system 100 and the hardware components associated therewith. For instance, the rule set is comprised of fourteen rules that are applied in a hierarchy to the print components within the print system 100. These rules are configured with the knowledge of the component limitations from the constraints module 104, and the requirements of each job from the job set 102 as they are applied for each preference from the preference module 106. In another example, the rules component 110 is utilized in place of the preference module 106 whereby each rule is selected individually by the user.

Once the preference module 106 and/or the rules component 110 have provided specific execution instructions for the print system 100, a scheduler 112 creates one or more print scenarios for the visualizer 108. An operator can review the scenarios displayed by the visualizer 108 and determine if any changes are necessitated. In one example, a scenario indicates that the time to complete a print job may be longer than desired. By modifying preferences, the operator can select different priorities for execution of the print job.

New scenarios can be created commensurate with new preference selection repeatedly until an appropriate scenario is selected to execute the print job. Once modifications have been made, the scheduler 112 can be updated to reflect changes, if any, to each scenario and print execution associated therewith. Once a user has validated the print execution scenario, a scheduling sequence component 114 provides an instruction set to hardware components 116 within the print system 100, whereby the print job is executed. The instruction set is utilized by the appropriate components within the print system 100 to execute the print job. The hardware components 116 provide information to the constraints module 104 to identify capabilities and limitations of the hardware components within the print system 100.

The visualizer 108 is an interface to present data in a textual/graphical format that allows a user to input information (e.g., preferences, rules, paper paths, etc.) to control various aspects of the print system 100. A graphical representation of each component and paper path can be presented wherein each component/paper path is selected (e.g., via a touch screen, mouse, etc.) to select particular hardware components and/or paper paths. A pre-configuration window can allow a user to view a queue of print jobs to be executed as well as a real time execution window that shows whether such instructions are being followed for each print job.

Further, the visualizer 108 can show a plurality of print jobs that are in line to be printed via the print system 100. Such multiple print jobs can be queued to provide information related to the resource usage within the print system 100 and allow a user to plan the utility of the components within the print system 100 accordingly. In one example, a completion time is provided for a plurality of disparate print modes so that a user can make an informed decision as to which mode to select. In another example, a customer has a print job with a high image quality requirement and wherein particular print engines are selected to execute a print job.

In yet another example, the visualizer 108 can be utilized to select a predictive maintenance schedule whereby system resources such as toner, ink and other consumables can require replacement at substantially the same time. By making such a selection, a particular set of rules can be created by the rules component 110 to route sheets to engines that have a greater amount of toner until they reach the same or similar level as other print engines. Once the amount of toner across all print engines is substantially equivalent, the sheets can be routed in equal distribution such that the toner levels in each printer decreases at substantially the same time. This can optimize short term productivity by deferring maintenance or improved run costs by allowing more pages to be printed on engines before maintenance is performed.

Figure 2:
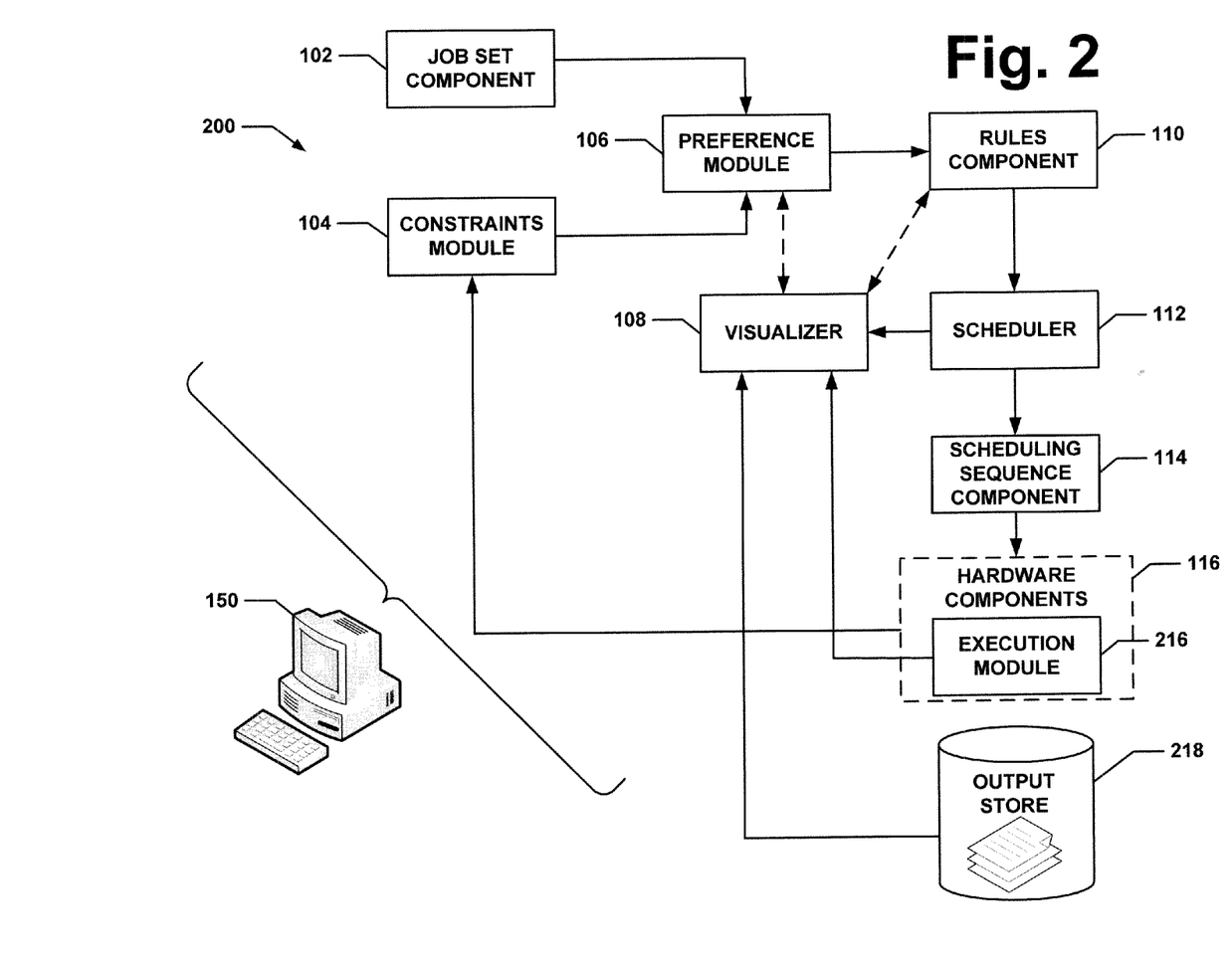
FIG. 2 illustrates a system that provides real time feedback of execution and output within a print system, in accordance with an exemplary embodiment.

FIG. 2 illustrates a print system 200 that includes an execution module 216 and a hard copy output store 218. The execution module 216 provides real time feedback related to the execution of each print job via the hardware components 116 as it proceeds through the print system 200. This real time feedback is fed to the visualizer 108 for review by an operator to monitor each print job as it is executed within the print system 200. In some instances, the instructions approved by the user may not be executed by the print system due to failure of one or more hardware components. In order to overcome such a condition, a user can modify the original approved instructions to monitor each print job as it is executed. The hard copy output store 218 provides a scanned image of each page printed via the print system 200. The hard copy image is provided to the visualizer 108 to allow an operator to verify that each sheet is printed as specified via the preference module 106 and/or the rules component 110.

An operator can make changes to preferences and/or rules via the visualizer 108 to modify the execution of one or more print jobs and/or the hard copy output associated therewith. In this manner, an operator can receive substantially real time feedback related to the output of each print job in order to make appropriate modifications as needed. In one example, the preference selected for a print job is associated with a policy for a particular customer. Once selected, a customer can visualize printing of current jobs in the queue related to a particular policy. Each policy can be associated with a rule set that facilitates execution of the print job as well as estimates of productivity, run costs and profitability for each print job. In addition, exceptions to the policy can be created that apply to a single job. Each print engine can be characterized to provide accurate control over generating exceptions. In addition, printer modules can be selected and associated with a specific job or class of jobs.

The visualizer 108 can also allow automated approaches with rules or constraints given by an operator that can then be implemented. For example, a rule can indicate that, based on some offline or online sensing of image quality or results in an engine going below a quality threshold, the operator will only let a particular print engine participate in printing non-color pages, or pages with no images. In this manner, an operator can monitor and select particular resource usage within the print system 200 as desired.

A computer 150 illustrates one possible hardware configuration to support the systems and methods described herein, including the systems 100 and 200 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 150 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 150 can further include a hard disk drive, a magnetic disk drive, e.g., to read from or write to a removable disk, and an optical disk drive, e.g., for reading a CD-ROM disk or to read from or write to other optical media. The computer 150 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 150 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 150 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 150 via any wireless or hard wire protocol and/or standard.

The computer 150 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 3:
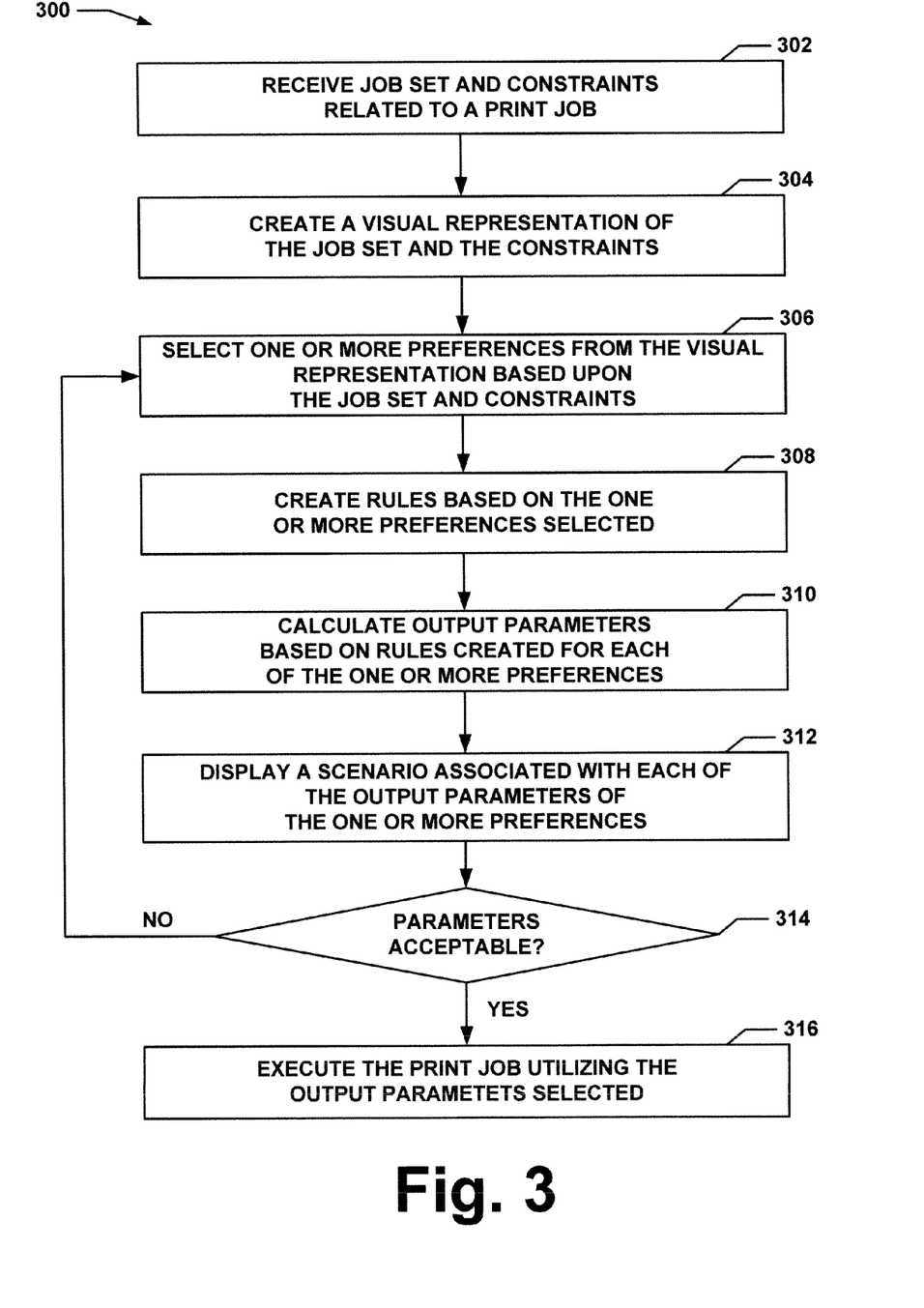
FIG. 3 illustrates a method to execute a print job based on parameters set via a visualizer, in accordance with an exemplary embodiment.

FIG. 3 illustrates a method to execute a print job utilizing output parameters selected by a user. At reference numeral 302, a job set and constraints associated therewith are received that relate to a print job. The job set can be related to particular requirements such as the number of pages printed and the content included on each page in the print job. The constraints of a print job can be related to the hardware utilized for execution of each print job such as feeders, print engines and/or finishers. At 304, a visual representation of the job set and the constraints is created for review by a user. Such visual representation can show textually and/or pictorially the job set parameters as well as the constraints associated with each engine utilized to facilitate the print job.

At 306, output preferences are selected from the visual representation based at least in part upon the job set and the constraints. The output preferences can be associated with a hierarchy of importance related to particular metrics such as speed of the print job, image quality, cost, and/or resource usage. The preferences can generate the creation of rules at 308 based at least in part upon the preferences selected. Rules creation can further be dependent upon the job set and the constraints associated with each print job as they relate to the limitations of the hardware utilized and the parameters that are specific to each print job. Such rules can dictate how sheets are routed throughout a print system and/or how each sheet is printed within each print job.

Once the preferences and rules have been selected and created, output parameters are calculated at 310 based at least in part upon the rules created. The output parameters can relate to how each sheet is accepted into a print system and routed to particular print engines and finished in view of the rules and preferences. At 312, a visual representation of the output parameters is created and presented to an operator as one or more scenarios. Each scenario allows a user to preview parameters related to execution of a print job.

At 314, a decision is made as to whether the parameters are acceptable. Such parameters can include the amount of time for the completion of each print job, the print engines utilized, the routing of each sheet within the print system, etc. If the parameters are acceptable, at 316, the print job is executed utilizing the output parameter selected. If the print job parameters are unacceptable, however, the method reverts back to reference numeral 306 wherein the output preferences are selected based at least in part upon the job set and constraints for a particular print job.

Figure 4:
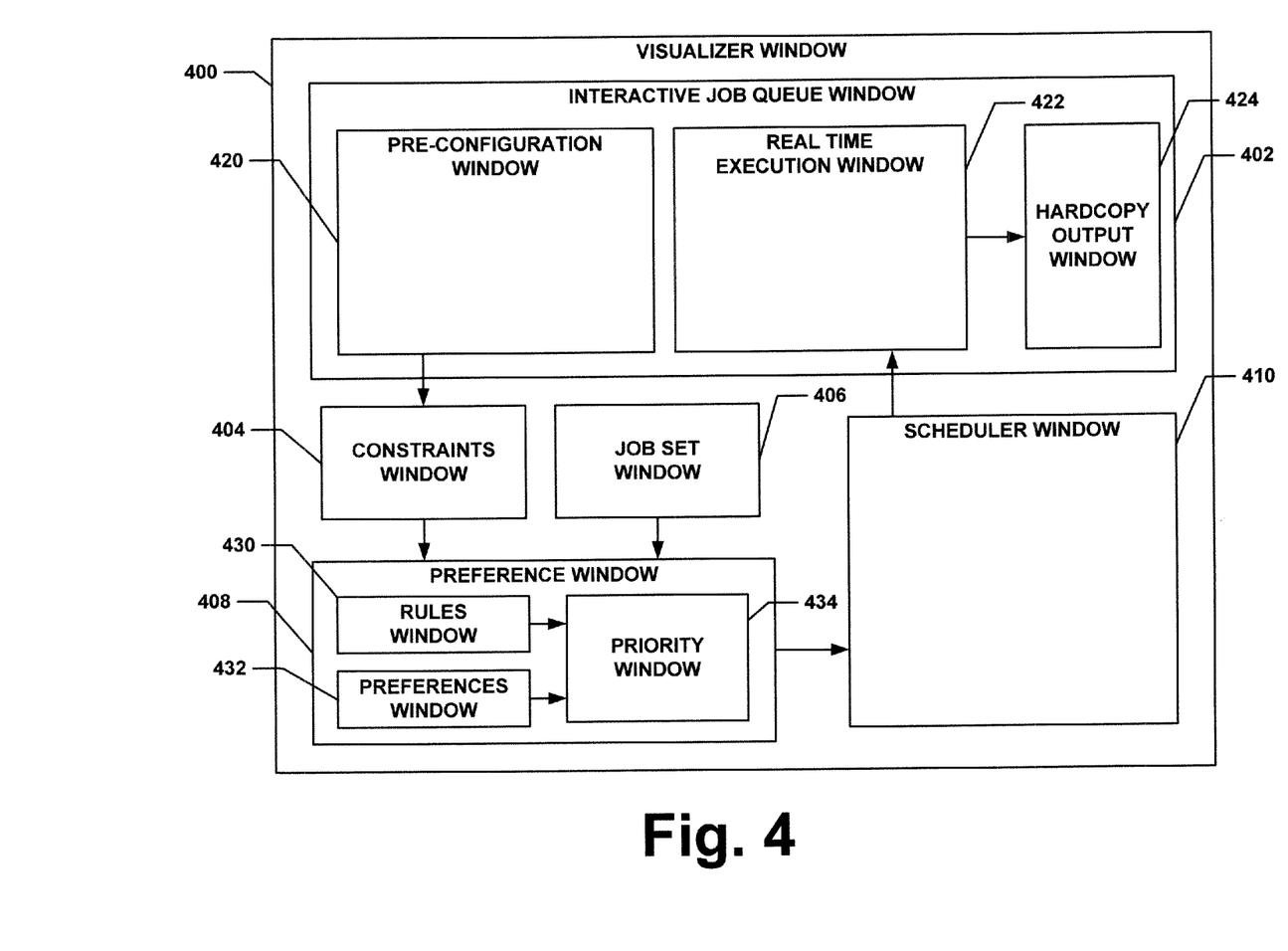
FIG. 4 illustrates a visualizer that allows a user to interface and control a print system, in accordance with an exemplary embodiment.

FIG. 4 illustrates the window 400 of visualizer 108 that includes a plurality of screen segments to allow an operator to configure and review one or more print jobs for execution within a print system. In this manner, an operator can receive real time feedback for disparate print job scenarios and further review a queue of one or more upcoming print jobs to aid in scenario planning. The visualizer 108 can further provide updates based on loss or change in system capabilities to inform the operator about various alternatives. Such control can be provided broadly via a policy, a preference and/or a rule or specifically by controlling individual sheets to be fed to particular print engines for a particular print job.

The visualizer 108 includes an interactive job queue window 402, a constraints window 404, a job set window 406, a preference module window 408 and a scheduler window 410. The interactive job queue window 402 includes a pre-configuration window 420 and a real time execution window 422. The pre-configuration window 420 allows an operator to review a visual presentation of a configuration for one or more print jobs set to be executed by a print system. The pre-configuration window 420 is a result of the rules and preferences for a particular print system and job set. In this manner, an operator is able to review the proposed implementation of a print job prior to execution.

In contrast, a real time execution window 422 shows one or more current print jobs as executed by a print system. It is to be appreciated that a plurality of subwindows can be contained within the preconfiguration window 420 and the real time execution window 422 to provide a comparison thereof. Thus, an operator can view a print job as configured and the same job in execution to note that the execution is carried out as expected. In addition, a hard copy output window 422 can illustrate a hard copy image of each sheet as it is output from a print system. While the real time execution window 422 shows the paper path and printing within a print system, the hard copy output window 424 illustrates the end product created via the real time execution components.

The preference module window 408 is utilized to set forth desired parameters for each print job. The constraints window 404 and the job set window 406 provide a priori data associated with each print job. In particular, the constraints window 404 lists the capabilities of each hardware component within a print system. Such constraints can be associated with the capabilities of each component. In particular, one print engine may be capable of printing color while another is capable of printing only black and white. One feeder may be capable of a particular stock of paper while another may be capable of image printing only. It is to be appreciated that such constraints are provided for exemplary purposes only and that substantially any limitation to a hardware component is contemplated.

The job set window 406 illustrates parameters associated with each job as set forth by a customer or other similarly situated party. A job set can include the number of copies, the toner to be utilized, the formatting of each page, the binding operation for each page, etc. It is to be appreciated that the job set does not include, however, the actual hardware components utilized to output a desired end product. Instead, such functionality is provided via the preference window 408.

The preference window 408 includes a priority window 434 that receives input from both a rules window 430 and a preferences window 432. The rules window 430 lists a plurality of rules that can be associated with each print job. Such rules can be created via preferences selected from the preferences window 432. In one example, the preferences window 432 lists a plurality of optimization algorithms such as high speed, low resource usage, low run costs, best image quality, color versus black and white, best productivity, high image quality, etc.

The preferences can be selected in a hierarchal fashion via the preferences window 432. If a conflict exists between a one or more preferences and one or more rules selected by the operator, the priority module 434 can resolve such conflicts. In one approach, the priority module window 434 can allow an operator to select on overall hierarchal scheme that is followed when assigning preferences and/or rules to a particular print job. In this manner, the priority module can serve as an override to any rules or preferences selected by an operator.

Once the preference module window has been configured, the scheduler window 410 provides one or more options to an operator related to each print job. In one example, the scheduler window 410 can output five different options based on five selected optimization schemes. In another example, the optimization schemes are not selected and the scheduler outputs each scenario and associated speed, cost, image quality, and resource usage. In this manner, an operator can make a selection by knowing which scenario is most applicable for a given print job. Once a particular scenario is selected, the print job can be executed wherein the execution associated with each print job is displayed in the real time execution window 422, as described above.

Figure 5:
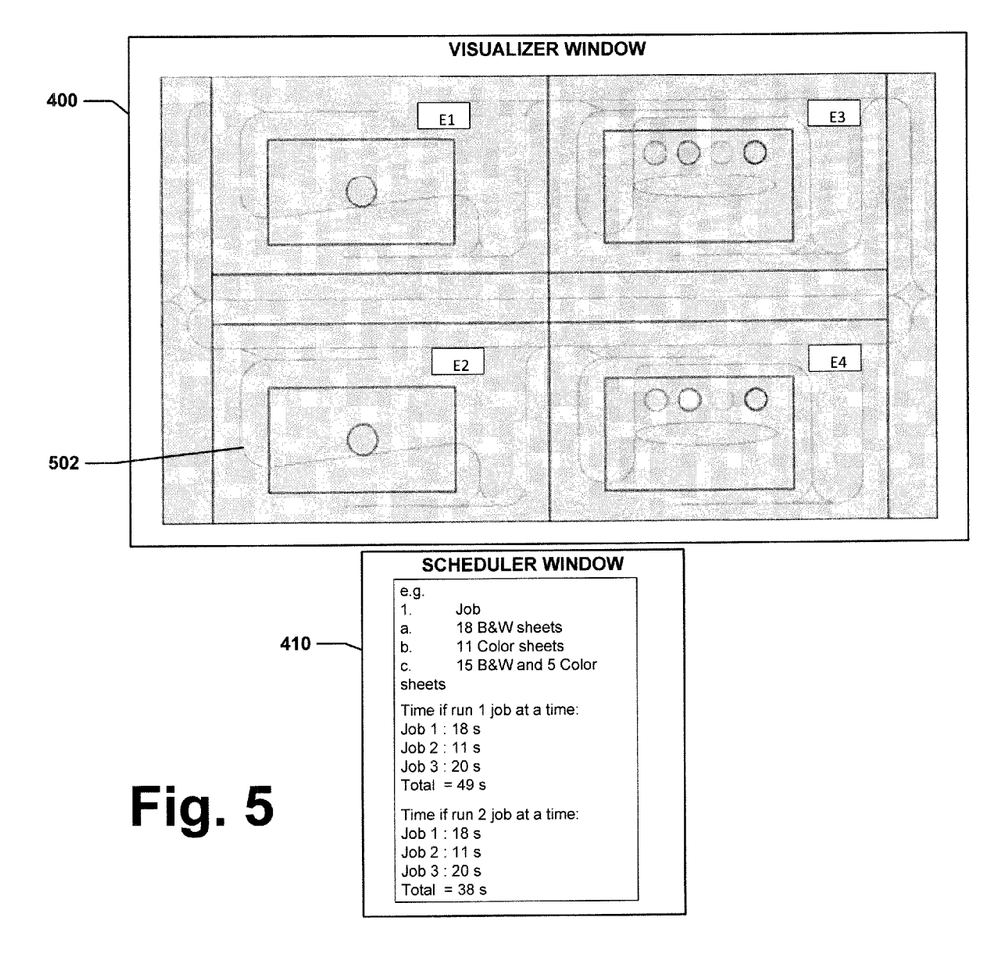
FIG. 5 illustrates an exemplary screen shot, a visualizer and a scheduler screen shot, in accordance with an exemplary embodiment.

FIG. 5 illustrates an exemplary visualizer window 108 and a scheduler window 410. In this example, the visualizer 108 shows four print engines E1, E2, E3, and E4 that are coupled via a paper path 502. The print engines E1 and E2 are shown as monochrome engines capable of printing in black and white, whereas the print engines E3 and E4 are capable of full color output. In one example, an operator can utilize a touch screen to select one or more print engines for use with a particular print job, and the paper path utilized therewith. Once selected, the scheduler 410 provides two disparate scenarios associated with the operator's selection.

In this example, a print job is broken into three disparate segments wherein a first segment in outputs 18 black and white sheets, a second segment outputs 11 color sheets and a third segments outputs 15 black and white and five color sheets. A first scenario illustrates a total time to print the job if the job is run serially (e.g. one at a time). In a second scenario, a time output of 38 seconds is shown if the same job is run in parallel (two at a time). Once the operator receives such feedback associated with the total run time for each job scenario, they may select an appropriate job for execution.

Figure 6:
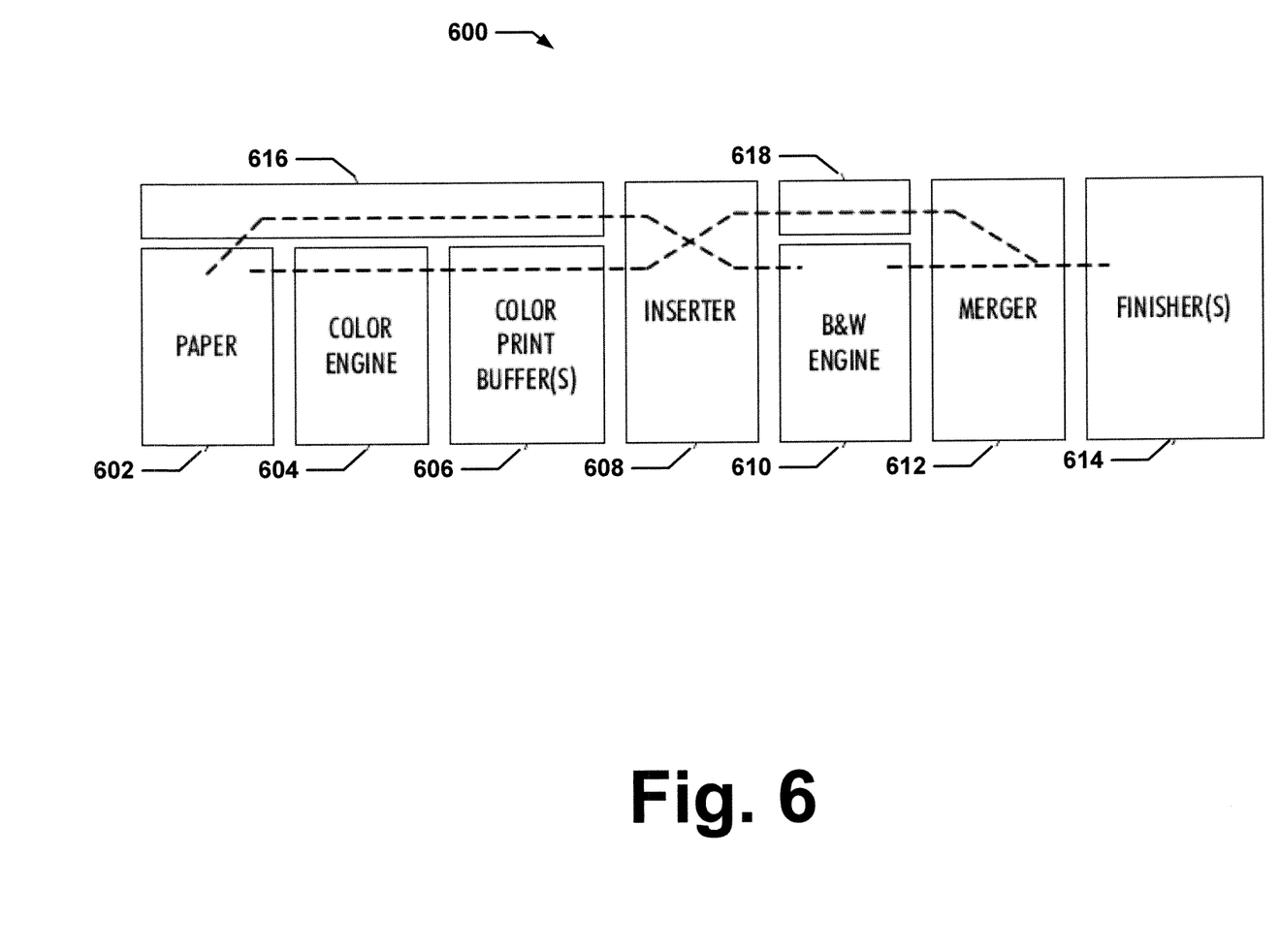
FIG. 6 illustrates a system comprising a plurality of components, such as may be employed in a universal production printer with a color print sheet buffer or a tightly-integrated parallel printer (TIPP) system, which represents an environment in which the various features described herein may be employed.

FIG. 6 illustrates a system 600 comprising a plurality of components, such as may be employed in a universal production printer with a color print sheet buffer often called a "tightly-integrated parallel printer" (TIPP) system, which represents an environment in which the various features described herein may be employed. The system 600 comprises a paper source 602, which may comprise one or more sheets of paper, and which is operatively associated with a color print engine 604 and an inserter 608. Paper from the paper source 602 may follow one of two paths. For instance, paper may be routed from the paper source 602 to the color print engine 604, and on to a color print buffer 606, before entering the inserter 608. Additionally or alternatively, paper may be routed directly from the paper source 602 to the inserter 608 (e.g., bypassing the color engine 604 and the color print buffer 606 using the highway path 616). Similarly, paper may bypass the black and white engine 610 using the highway path 618.

Paper that has been routed directly from the paper source 602 to the inserter 608 may be passed to a black-and-white print engine 610, then through a merger 612 that merges black-and-white and color pages, before proceeding on to a finisher 614 that finishes the document for presentation to a user. It will be appreciated that according to other examples, a page may pass through all components of the system 600 and may have both color portions and black-and-white portions. The actions associated with a job performed by system 600 may be organized into a series of events that define one or more solutions, or "plans," to the job.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system to view and configure one or more print job scenarios within a print system having a plurality of print engines, the system comprising:
   a preference module that allows a print system operator to select one or more preferences related to a print job in view of a job set and one or more limitations related to hardware within the print system;
   a rules component that creates one or more rules for use within the print system to output a hard copy based at least in part upon the preferences selected via the preference module;
   a scheduler that receives one or more rules from the rules component and configures the print system to execute the print job according to the preferences and/or the rules; and
   a visualizer that displays one or more windows during printing system operation providing the print system operator with a visual presentation of output parameters including print engines utilized and sheet routing within the print system for a plurality of disparate alternative complete print job scenarios for a print job, each print job scenario being associated with a print system configuration for the entire print job as configured by the scheduler, wherein the preferences and the rules can be edited.

2. The system according to claim 1 further including:
   a job set component to provide the requirements for one or more print jobs to the preference module; and
   a constraints module that provides limitations related to each component within the print system to the preference module.

3. The system according to claim 1 wherein the print job requirements include at least one of a page count, a toner requirement, a paper stock, a font, a page format, a page margin, a binding requirement and a page content.

4. The system according to claim 1 wherein the constraints module provides at least one of a toner capability, a stock capability, a binding capability, a speed capability, a resource usage limitation and a cost associated with each component within the print system.

5. The system according to claim 1 further including: a scheduling sequence component that creates an instruction set from the scenario selected via the scheduler, wherein the instruction set is utilized by the appropriate components within the print system to execute the print job.

6. The system according to claim 1 wherein the visualizer allows selection of one or more components within the print system and a print path to route pages through the print system.

7. The system according to claim 1 further including: an execution module that presents a visual representation of real time execution of the print job as specified by the scheduler.

8. The system according to claim 1 further including: a hard copy output store that stores a scanned image of each sheet output by the print system wherein each sheet is associated with an appropriate print job.

9. The system according to claim 1 wherein the scheduler provides one or more scenarios that quantify at least one of a time, a quality, a cost and a resource usage related to the preferences selected via the preference module.

10. The system according to claim 1 wherein the preference module allows selection of one or more preferences and the placement of such preferences in order of priority.

11. The system according to claim 1 further including the visualizer displaying a plurality of different print jobs in line to be printed, wherein the print jobs are queued for scenario planning and to provide information related to resources used with the print system.

12. A method to view and configure one or more print jobs within a print system adapted to execute a print job comprising:
   receiving a job set that defines a print job;
   receiving one or more constraints that define the limitations of hardware components within the print system;
   creating a visual representation of the job set and the constraints during printing system operation;
   selecting one or more preferences from the visual representation based upon the job set and the constraints;
   calculating output parameters based on rules created for each of the one or more preferences;
   displaying simultaneously a visual presentation of the output parameters including print engines utilized and sheet routing within the print system for a plurality of disparate alternative complete print job scenarios for a print job to the print system operator during printing system operation for execution of the print job;
   modifying the preferences when the print job scenarios are unacceptable; and,
   displaying the preferences, the rules, and the print job scenarios on a user interface to allow print system operator modification of at least one of the preferences and the rules during print system operation.

13. The method according to claim 12, wherein the preferences selected are based at least in part of a customer job policy.

14. The method according to claim 12 wherein the preferences selected each relate to optimization of the print system as it relates to a cost, a color, a resource usage, a time and a preventative maintenance optimization.

15. The method according to claim 12 further comprising: presenting a visual representation of real time execution of the print job as specified by the scheduler.

16. A system having an interface to view and configure one or more print job scenarios within a print system comprising:
   an interactive job queue window displays a visual presentation of a print system configuration that allows a print system operator during operation of the print system to configure a print job as it relates to hardware components and paper paths within the print system;
   a real time execution window that shows execution of the print job and a hard copy output window that shows hard copy output images of the print job;
   a preference window that displays one or more preferences for selection by the print system operator during operation of the print system for each print job in order to optimize the print system for a particular purpose;
   a scheduler window that displays during operation of the print system a scenario associated with each preference selected for a print job configuration; and a visualizer that displays one or more of the windows during printing system operation providing the print system operator with a visual presentation of output parameters including print engines utilized and sheet routing within the print system for a plurality of disparate alternative complete print job scenarios for a print job, each print job scenario being associated with a print system configuration for the entire print job as configured by the scheduler window, wherein the preferences can be edited.

17. The system according to claim 16, further including: a constraints window that displays one or more constraints related to hardware components within the print system.

18. The system according to claim 16, further including: a job set window that includes requirements for each print job to include at least one of a page count, a toner requirement, a stock, a font, a page format, a page margin, a binding requirement and a page content.

19. The system according to claim 16, wherein the interactive job queue window, the preference window and the scheduler window are all displayed on a single user interface.

20. The system according to claim 16, wherein the preference window further includes a preference window that allows the review and selection of one or more preferences related to a print job; a rules window that displays rules associated with each preference selected; and, a priority window that allows a user to prioritize each of the one or more preferences and rules for use with the print job.

* * * * *